United States Patent
Müller et al.

(10) Patent No.: US 11,130,114 B2
(45) Date of Patent: Sep. 28, 2021

(54) PRODUCTION OF DOPED NANOPARTICLES, AND USE OF SAME

(71) Applicant: Leibniz-Institut für Neue Materialien gemeinnützige GmbH, Saarbrücken (DE)

(72) Inventors: Nina Müller, Saarbrücken (DE); Peter Rogin, Saarbrücken (DE); Peter William de Oliveira, Saarbrücken (DE); Thomas Müller, Neunkirchen (DE)

(73) Assignee: Leibniz-Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 16/465,598

(22) PCT Filed: Dec. 7, 2017

(86) PCT No.: PCT/EP2017/081804
§ 371 (c)(1),
(2) Date: May 31, 2019

(87) PCT Pub. No.: WO2018/114351
PCT Pub. Date: Jun. 28, 2018

(65) Prior Publication Data
US 2019/0381482 A1    Dec. 19, 2019

(30) Foreign Application Priority Data
Dec. 22, 2016  (DE) .................. 10 2016 125 432.0

(51) Int. Cl.
| | | |
|---|---|---|
| B01J 21/06 | (2006.01) | |
| B01J 35/00 | (2006.01) | |
| B01J 37/04 | (2006.01) | |
| B01J 37/10 | (2006.01) | |

(52) U.S. Cl.
CPC .......... B01J 21/063 (2013.01); B01J 35/004 (2013.01); B01J 35/0013 (2013.01); B01J 37/04 (2013.01); B01J 37/105 (2013.01)

(58) Field of Classification Search
CPC .... B01J 21/063; B01J 35/0013; B01J 35/004; B01J 37/04; B01J 37/105
See application file for complete search history.

(56) References Cited

U.S. PATENT DOCUMENTS

| | | | |
|---|---|---|---|
| 5,593,781 A | 1/1997 | Nass et al. | |
| 5,910,522 A | 6/1999 | Schmidt et al. | |
| 7,901,657 B2 | 3/2011 | Arpac et al. | |
| 9,126,848 B2 * | 9/2015 | de Oliveira | C01G 25/02 |
| 2006/0210798 A1 * | 9/2006 | Burda | A61K 33/18 |
| | | | 428/402 |
| 2013/0236708 A1 | 9/2013 | Moh et al. | |
| 2013/0236732 A1 | 9/2013 | de Oliveira et al. | |
| 2013/0333757 A1 | 12/2013 | Hwang | |
| 2014/0364795 A1 | 12/2014 | Tan et al. | |

FOREIGN PATENT DOCUMENTS

| | | |
|---|---|---|
| CN | 100998937 A | 7/2007 |
| CN | 106076391 A | 11/2016 |
| DE | 4212633 | 10/1993 |
| DE | 10235803 A1 | 2/2004 |
| DE | 102004009287 A1 | 9/2005 |
| DE | 102010052032 A1 | 5/2012 |
| DE | 102010052033 A1 | 5/2012 |
| EP | 1525338 B1 | 4/2005 |
| KR | 1020050028723 A | 3/2005 |
| WO | 9321127 A1 | 10/1993 |
| WO | 9631572 A1 | 10/1996 |
| WO | 2005105304 A2 | 11/2005 |
| WO | 2011079908 A1 | 7/2011 |

OTHER PUBLICATIONS

English Abstract of WO 9631572 A1, Oct. 10, 1996.
English Abstract of WO 9321127 A1, Oct. 28, 1993.
English Abstract of DE 10235803 A1, Feb. 19, 2004.
English Abstract of EP 1525338 B1, Apr. 27, 2005.
English Abstract of WO 2011079908 A1, Jul. 7, 2011.
English Abstract of WO 2005105304 A2, Nov. 10, 2005.
International Preliminary Report on Patentability, dated Jul. 4, 2019.
English Abstract of KR 1020050028723 A, Mar. 23, 2005.
English Abstract of DE 4212633, Oct. 21, 1993.
English Abstract for CN 100998937A, Jul. 18, 2007.
English Abstract for CN 106076391A, Nov. 9, 2016.
Zhang et al., "HNO3-involved one-step low temperature solvothermal synthesis of N-doped TiO2 nanocrystals for efficient photocatalytic reduction of Cr(VI) in water", Applied Catalysis B: Environmental 142-143, (2013) 249-258.

* cited by examiner

*Primary Examiner* — Michael P Wieczorek
(74) *Attorney, Agent, or Firm* — Cahn & Samuels, LLP

(57) ABSTRACT

A process for producing doped nanoparticles, in particular for N-doped nanoparticles, includes a hydrothermal process using an organic nitrogen-containing compound or a mineral acid having at least one nitrogen atom. In particular, the photocatalytically active particles produced are characterized by a particularly high activity even in visible light.

15 Claims, 3 Drawing Sheets

PRODUCTION OF DOPED NANOPARTICLES, AND USE OF SAME

This patent application is a U.S. national stage application of PCT international application PCT/EP2017/081804 filed on 7 Dec. 2017 and claims priority of German patent document 10 2016 125 432.0 filed on 22 Dec. 2016, the entireties of which are incorporated herein by reference.

FIELD OF THE INVENTION

The invention relates to a process for producing doped nanoparticles, in particular N— or N/C-doped nanoparticles, and also uses of these nanoparticles.

BACKGROUND OF THE INVENTION

Many methods for producing nanoparticles in sol-gel processes are known in the prior art (DE 10 2004 009 287 A1). Nanoparticles can be obtained in good quality using these processes. However, these processes are often multi-stage and require, for example, the addition of catalysts which lead to impurities in the product. The production of metal-doped nanoparticles is also known.

In doping of the nanoparticles with nonmetallic elements, for example N or C, further process steps are frequently necessary. The particles frequently also have to be subjected to an additional calcination.

The doping can, particularly in the case of photocatalytically active nanoparticles, influence the absorption wavelength.

It is an object of the invention to provide a process for producing doped nanoparticles which avoids the disadvantages of the prior art.

SUMMARY OF THE INVENTION

This object is achieved by the inventions having the features of the independent claims. Advantageous embodiments of the inventions are characterized in the dependent claims. The wording of all claims is hereby incorporated by reference into the present description. The inventions also encompass all purposeful combinations and in particular all combinations mentioned of independent and/or dependent claims.

The invention provides a process for producing doped nanoparticles.

Individual process steps are described in more detail below. The steps do not necessarily have to be carried out in the order indicated, and the process to be described can also have further steps which are not mentioned.

In a first step, a composition comprising at least one hydrolysable metal compound, at least one compound having at least one hydroxyl group, at least one organic compound and/or mineral acid comprising at least one nitrogen atom is provided.

In a further embodiment of the invention, the hydrolysable metal compound is at least one compound of the general formula (I)

$MX_n$, where M is a metal and X is a hydrolysable group which can be identical or different at each occurrence, where two groups X can be replaced by a bidentate hydrolysable group or an oxo group or three groups X can be replaced by a tridentate hydrolysable group, and n corresponds to the valence of the element and is frequently 3 or 4.

M is advantageously selected from the group consisting of Mg, B, Al, Ga, In, Si, Ge, Sn, Pb, Y, Ti, Zr, V, Nb, Ta, Mo, W, Fe, Cu, Ag, Zn, Cd, Ce and La, with preference being given to Al, B, Si, Pb, Ti, Zr, particularly preferably Ti, Zn and Zr. Ti is of particular interest because of the formation of photocatalytically active $TiO_2$ particles.

Examples of hydrolysable groups are, for example, halogen (F, Cl, Br or I, in particular Cl and Br), $C_{1-20}$-alkoxy, preferably $C_{1-10}$-alkoxy such as ethoxy, n-propoxy, i-propoxy, n-butoxy, i-butoxy, sec-butoxy, tert-butoxy, linear or branched pentoxy, hexoxy, heptoxy or octoxy, e.g. 2-ethylhexoxy, cyclohexyloxy, $C_{1-3}$-acyloxy such as acetoxy or propionyloxy, $C_1$-$C_{20}$-alkenyloxy, preferably $C_{1-10}$-alkenyloxy such as vinyl or allyloxy, e.g. butenoxy, pentenoxy, hexenoxy, heptenoxy, octenoxy and higher alkenoxy groups, with pentenyl and hexenyl being preferred, e.g. $CH_3CH_2CH=CHCH_2CH_2O—$ or $CH_2=CH(CH_2)_4O—$, $C_1$-$C_{20}$-alkynyloxy, preferably $C_1$-$C_{10}$-alkynyloxy such as pentynyloxy or hexynyloxy, or $C_{2-3}$-alkylcarbonyl such as acetyl, aryloxy groups, aralkyloxy groups and alkaryloxy groups having from 6 to 20, preferably from 6 to 15, carbon atoms, e.g. phenyloxy, naphthyloxy, tolyloxy and benzyloxy.

The alkoxy group can be branched or preferably linear; an advantageous branched alkoxy group is, for example, 2-ethylhexoxy. The alkenyloxy group can be branched or preferably linear, and the double bond can be in any position. It is also possible for more than one double bond to be present.

The hydrolysable group can also be an ether group, e.g. of the general formula $R^1(—OR^2)_xO—$, where $R^1$ is a $C_{1-20}$-alkyl group, $R^2$ is an alkylene group, e.g. having from 1 to 4 carbon atoms, for example ethylene or propylene, and x is an integer from 1 to 4, preferably 1 or 2. The group $R^1$ is preferably a $C_1$-$C_{10}$-alkyl group such as methyl, ethyl, butyl, pentyl, hexyl, cyclohexyl, heptyl or octyl. Specific examples are butoxyethoxy and hexoxyethoxy.

Examples of hydrolysable compounds are $Al(OCH_3)_3$, $Al(OC_2H_5)_3$, $Al(O—n—C_3H_7)_3$, $Al(O—i—C_3H_7)_3$, $AlCl_3$, $AlCl(OH)_2$, $Ti(OCH_3)_4$, $Ti(OC_2N_5)_4$, $TiCl_4$, $Ti(OC_2H_5)_4$, $Ti(O—n—C_3H_7)_4$, $Ti(O—i—C_3H_7)_4$, $ZrCl_4$, $Zr(OC_2H_5)_4$, $Zr(O—n—C_3H_7)_4$, $Zr(O—i—C_3H_7)_4$, $ZrOCl_2$, boric acid, $BCl_3$, $B(OCH_3)_3$, $B(OC_2H_5)_3$, $SnCl_4$, $Sn(OCH_3)_4$, $Sn(OC_2H_5)_4$, $Zn(OAc)_2$, $Si(OOCCH_3)_4$, $VOCl_3$ and $VO(OCH_3)_3$, $Si(OCH_3)_4$, $Si(OC_2H_5)_4$, $Si(O—n—or i—C_3H_7)_4$, $SiCl_4$, $HSiCl_3$, $Al(O—n—C_4H_9)_3$, $Al(O—sec—C_4H_9)_3$, $Al(OC_2H_4OC_4H_9)_3$, $Ti(OC_4H_9)_4$, Ti (pentoxy)$_4$, Ti (hexoxy) 4, Ti (2-ethylhexoxy)$_4$, $Zr(OC_4H_9)_4$, Zr(pentoxy)$_4$, Zr(hexoxy)$_4$, Zr(2-ethylhexoxy)$_4$, and also Zr compounds which have complexing radicals, e.g. β-diketone and (meth)acrylic radicals, $Si(OC_4H_9)_4$, where the pentoxy and hexoxy radicals mentioned can be linear or branched.

M is preferably Ti, Zn or Zr. Specifically preferred titanates are $Ti(OCH_3)_4$, $Ti(OC_2H_5)_4$ and Ti(n— or i—$OC_3H_7)_4$.

The hydrolysable compounds having the hydrolysable groups mentioned can be commercially available. They can also be prepared from other hydrolysable compounds, e.g. by means of exchange reactions. This can be advantageous when, for example, other hydrolysable compounds are more readily accessible. Thus, for example, a metal or semimetal alkoxide, e.g. a metal ethoxide or propoxide, can be reacted with a higher alcohol, e.g. pentanol, hexanol or 2-ethylhexanol, in order to replace the alkoxy group of the alkoxide by the alkoxy group of the higher alcohol. The exchange reaction can be carried out to completion or only partially.

Such an exchange reaction can also be used for forming the desired compounds having hydrolysable, lipophilic groups from other hydrolysable compounds in situ and for reacting these without isolation directly to form the desired nanoparticles.

The hydrolysable metal or semimetal compounds, e.g. those of the formula (I) above, can also bear complexing radicals, e.g. β-diketone and (meth)acrylic radicals. Particularly in the case of the more reactive alkoxides (e.g. of Al, Ti, Zr, etc.), it can sometimes be advisable to use these in complexed form; examples of suitable complexing agents are unsaturated carboxylic acids and β-dicarbonyl compounds, e.g. methacrylic acid, acetylacetone and ethyl acetoacetate.

It is also possible to use hydrolysable compounds which contain at least one unhydrolyzable group. Examples are silanes of the general formula $$R_aSiX_{(4-a)} \quad (II),$$

where the radicals R are identical or different and are unhydrolyzable groups, the radicals X are identical or different and are hydrolysable groups or hydroxy groups and a is 1, 2 or 3, or an oligomer derived therefrom. The value of a is preferably 1 or 2.

In the general formula (II), the hydrolysable groups X, which can be identical or different, are, for example, hydrogen or halogen (F, Cl, Br or I), alkoxy (preferably $C_{1-6}$-alkoxy such as methoxy, ethoxy, n-propoxy, i-propoxy and butoxy), aryloxy (preferably $C_{6-10}$-aryloxy such as phenoxy), acyloxy (preferably $C_{1-6}$-acyloxy such as acetoxy or propionyloxy), alkylcarbonyl (preferably $C_{2-7}$-alkylcarbonyl such as acetyl), amino, monoalkylamino or dialkylamino preferably having from 1 to 12, in particular from 1 to 6, carbon atoms. Preferred hydrolysable radicals are halogen, alkoxy groups (in particular ethoxy and methoxy) and acyloxy groups. If hydrolysable groups are to be introduced into the nanoparticles using a silane of the formula (II), X can be one of the above hydrolysable groups, e.g. hydrolysable groups described for the compounds of the formula (I).

The composition additionally comprises at least one compound having at least one hydroxyl group. This compound is advantageously the solvent for the hydrolysable compound. Preference is given to a compound having a boiling point below 200° C. (at atmospheric pressure). Such compounds are, for example, lower aliphatic alcohols ($C_1$-$C_6$-alcohols) such as methanol ethanol, 1-propanol, i-propanol, sec-butanol, tert-butanol, isobutyl alcohol, n-butanol and the pentanol isomers, in particular 1-pentanol. Preference is given here to methanol, ethanol, n-propanol, isopropanol and n-butanol.

In a preferred embodiment of the invention, the composition also comprises water for hydrolyzing the hydrolysable metal compound. Water is particularly preferably present in a substoichiometric amount based on the hydrolysable groups of the metal compound, i.e. less than 1 mol of water is present per 1 mol of hydrolysable groups in the metal compound. In other words, less than 4 mol of water are added per 1 mol of metal compound in the case of a hydrolysable metal compound having 4 hydrolysable groups (e.g. a titanium compound). Preference is given to using not more than 0.7 mol, more preferably not more than 0.6 mol and in particular not more than 0.5 mol or 0.4 mol, and not less than 0.30 mol, more preferably not less than 0.35 mol, of water per 1 mol of hydrolysable groups in the metal compound.

As a result, hydrolysable groups, in particular from the metal compound, remain on the surface of the particles produced after conclusion of the synthesis, which significantly improves the redispersibility of the particles. In addition, such nanoparticles can be surface-modified more simply.

The composition additionally comprises at least one organic compound and/or mineral acid comprising at least one nitrogen atom.

For the purposes of the present invention, an organic compound comprising at least one nitrogen atom is a compound without a metallic or semimetallic cation. Examples of such compounds are amines, hydrazines, nitriles, isonitriles, cyanates, isocyanates, or derivatives or salts of such compounds. These compounds can, for example, be alkylated by alkyl radicals having from 1 to 6 carbon atoms. The compounds can be ammonium compounds such as ammonium nitrate, ammonium chloride or ammonium acetate. These can also be alkylated, e.g. tetrabutylalkylammonium hydroxide.

The mineral acid comprising at least one nitrogen atom is preferably nitric acid. For the purposes of the present invention, this is $NO_2$ dissolved in water.

For the doping with nitrogen, the organic compound and/or mineral acid is added in an amount sufficient for doping. In general, such ratios are used that, for example, a molar ratio of nitrogen (N) to the metal of the hydrolysable metal compound (Me) (N/Me) of from 0.0005:1 to 0.4:1, preferably from 0.001:1 to 0.3:1 and more preferably from 0.005:1 to 0.3:1, is obtained. The ratio can also result from a combination of compounds and/or mineral acids.

It may be necessary to add at least one acidic hydrolysis catalyst to effect the hydrolysis of the hydrolysable metal compound. This catalyst is preferably a mineral acid such as hydrochloric acid, sulfuric acid or phosphoric acid. This is particularly the case when only an organic compound or only a small amount of mineral acid comprising at least one nitrogen atom is used for doping.

In a particularly preferred embodiment, the mineral acid comprising at least one nitrogen atom also serves as acidic hydrolysis catalyst. The use of nitric acid has the particular advantage that this acid simultaneously serves as hydrolysis catalyst for the hydrolysable metal compound. The composition preferably does not comprise any further catalyst for the hydrolysis of the metal compound. In addition, no further elements apart from H, N and O, which could contaminate the particles obtained, are introduced into the reaction. The nitric acid is preferably used in such a ratio that a molar ratio of nitrogen (N) to the metal of the hydrolysable metal compound (Me) (N/Me) of from 0.05:1 to 0.7:1, preferably from 0.05:1 to 0.5:1 and more preferably from 0.1:1 to 0.4:1, is obtained. The composition preferably does not comprise any further hydrolysis catalysts.

In a further embodiment of the invention, the composition does not comprise any organic compound comprising at least one nitrogen atom.

The mixture obtained is then treated at a temperature of at least 60° C. with formation of a dispersion or a precipitate of nanoparticles. This heat treatment is carried out hydrothermally.

The heat treatment is preferably carried out over a time of from 0.5 to 30 hours, preferably from 0.5 to 12 hours, with the time being dependent on the temperature and the optionally applied or autogenous pressure. For example, in the case of Ti compounds, anatase is obtained in nanoparticulate crystalline form by hydrothermal treatment at 225° C. and autogenous pressure after a reaction time of 1 hour.

In general, a hydrothermal treatment is understood to be a heat treatment of an aqueous solution or suspension under superatmospheric pressure, e.g. at a temperature above the boiling point of the solvent and a pressure above 1 bar.

For the purposes of the present invention, a heat treatment in a predominantly organic solvent under superatmospheric pressure is also taken to be a hydrothermal treatment.

In the hydrothermal treatment, the mixture is heat treated in a closed vessel or a closed autoclave. The treatment is preferably carried out at a temperature in the range from 75° C. to 300° C., preferably above 200° C., more preferably from 225 to 275° C., e.g. about 250° C. A pressure (autogenous pressure) is built up in the closed vessel or autoclave due to the heating, in particular above the boiling point of the solvent.

The pressure attained can, for example, be above 1 bar, in particular from 50 to 500 bar or more, preferably from 100 to 300 bar, e.g. 225 bar. In general, the hydrothermal treatment is carried out for at least 0.5 hour and preferably for up to 10 or 15 hours.

The heat treatment in step b) is carried out until the desired nanoparticles have been formed.

The nanoparticles are separated off from the solvent. All methods known to those skilled in the art can be used for this purpose. Centrifugation is particularly useful. Volatile constituents, for example the compound having at least one hydroxyl group, can optionally be distilled off beforehand under subatmospheric pressure, e.g. in a rotary evaporator at 40 mbar.

The nanoparticles which have been separated off are then dried (e.g. at 40° C. and 10 mbar). In this form, the nanoparticles can also be stored readily. The nanoparticles can also be freeze-dried from an aqueous suspension.

The nanoparticles obtained display a particularly good redispersibility. They can easily be redispersed completely. This is important for producing transparent dispersions. It may be necessary to adjust the pH of the dispersion by addition of acid. Surface modification can also be additionally carried out during redispersion.

The hydrothermal treatment in the closed vessel specifically makes it possible to use volatile compounds, in particular nitric acid, for doping the particles. If the particles were to be produced under reflux or by simple heating, the volatile compound would be removed from the composition as a result of heating even could before doping can occur. In addition, it is necessary to work with a very large excess, so that precise control of doping is not possible.

The nanoparticles obtained by means of the process of the invention can be used directly. Calcination is not necessary. The composition can also comprise further compounds for doping. It is possible to use any suitable metal compound for doping, e.g. an oxide, a salt or a complex, e.g. halides, nitrates, sulfates, carboxylates (e.g. acetates) or acetylacetonates. The compound should advantageously be soluble in the solvent used for the mixture.

As metal, it is possible to use any metal, in particular a metal selected from groups 5 to 14 of the Periodic Table of the Elements and the lanthanides and actinides. The metal can occur in any suitable preliminary oxidation state in the compound. Examples of suitable metals for the metal compound are W, Mo, Cr, Zn, Cu, Ag, Au, Sn, In, Fe, Co, Ni, Mn, Ru, V, Nb, Ir, Rh, Os, Pd and Pt. Metal compounds of W (VI), Mo (VI), Cr (lit), Zn (II), Cu (II), Au (III), Sn (IV), In(III), Fe (III), Co (II), V (V) and Pt (IV) are preferably used. Very good results are achieved using, in particular, W (VI), Mo (VI), Zn (II), Cu (II), Sn (IV), In(III) and Fe (III). Specific examples of preferred metal compounds are $WO_3$, $MoO_3$, $FeCl_3$, silver acetate, zinc chloride, copper(II) chloride, indium(III) oxide and tin(IV) acetate.

The ratio between the metal compound and the hydrolysable metal compound also depends on the metal used and the oxidation state thereof. In general, use is made of, for example, such ratios that a molar ratio of metal of the metal compound (Me') to the metal of the hydrolysable metal compound (Me) (Me'/Me) of from 0.0005:1 to 0.2:1, preferably from 0.001:1 to 0.1:1 and more preferably from 0.005:1 to 0.1:1, is obtained.

Instead of the metal doping, it is also possible to carry out an additional doping with semimetal elements or nonmetallic elements, e.g. with carbon, phosphorus, sulfur, boron, arsenic, antimony, selenium, tellurium, chlorine, bromine and/or iodine. For this purpose, either the elements as such or suitable element compounds are used as dopants. Doping is particularly advantageous when using titanium compounds in order to influence the photocatalytic properties.

In a preferred embodiment of the invention, the composition comprises an organic carbon-containing compound for additional doping of the particles with carbon.

This is preferably an organic compound having at least 4 carbon atoms which is soluble in the composition. This organic compound preferably comprises only H, C and O atoms. For example, compounds comprising ether, ester, carboxyl or hydroxyl groups or combinations of these groups are possible. The compounds are preferably soluble in the composition.

This compound preferably has a decomposition temperature below the temperature of the hydrothermal treatment.

Preferred compounds are, in particular, compounds which can be reduced to carbon under the conditions of the reaction. These are preferably organic compounds comprising keto or aldehyde groups, e.g. aldoses or ketoses, in particular C5- or C6-ketoses or aldoses, e.g. glucose.

The composition of the invention is a homogeneous, in particular single-phase, solution before the hydrothermal treatment. All constituents are present in dissolved form.

The particles produced are nanoparticles. This means that they have an average diameter of less than 100 nm, preferably an average diameter of less than 50 nm, particularly preferably less than 20 nm (determined by means of TEM).

In particular, the nanoparticles produced have a maximum diameter of less than 200 nm, preferably less than 100 nm, particularly preferably less than 50 nm, or less than 30 nm (determined by means of TEM).

In an embodiment of the invention, at least 50% of the particles are cube-shaped, preferably at least 60%, in particular at least 80%.

Preference is given to producing photocatalytically active particles, particularly preferably doped ZnO or $TiO_2$ nanoparticles, with $TiO_2$ being preferred.

The doped $TiO_2$ nanoparticles obtained in the dispersion, the precipitate or the powder are predominantly present in the crystalline anatase form. The proportion of crystalline material preferably makes up more than 90%, preferably more than 95% and in particular more than 97%, of the doped $TiO_2$ nanoparticles obtained, i.e. the proportion of amorphous material is, in particular, below 3%, e.g. is 2%.

The doped nanoparticles, in particular $TiO_2$ nanoparticles, are characterized, in particular, in that they also display photocatalytic activity on excitation with visible light having a wavelength of >380 nm ("visible-light or daylight photocatalysts").

The photocatalytic activity can, for example, be confirmed by the deposition of metallic layers under the conditions of the examples according to the invention.

The nanoparticles obtained can also be surface-modified, for example in order to make them compatible with a solvent or matrix material during further processing.

In a preferred embodiment, the nanoparticles produced are supplemented with function groups. These function groups are groups on the surface of the nanoparticles which give the nanoparticles an additional desired function. By means of such functionalization, the nanoparticles can be matched if required to desired properties.

In this way, the nanoparticles can acquire an improved or, if advantageous, poorer compatibility with, for example, other materials with which they are, for example, to be mixed. For example, a hydrophobic, hydrophilic, oleophobic or oleophilic function can be introduced by means of the function group. To achieve hydrophobic and/or oleophobic properties, it is possible to introduce, for example, function groups which comprise fluorinated hydrocarbon chains.

A further preferred function group is one in the case of which one or more functional groups are introduced on the surface of the nanoparticles. Reactions with, for example, other materials or between the nanoparticles are then made possible by means of these. Particular preference is given to functional groups which are suitable for crosslinking reactions, so that the thus modified nanoparticles are, for example, linked to a matrix-forming material having suitable functional groups by chemical reaction with the material or crosslinked these.

Such function groups can be obtained by reaction of the nanoparticles with a surface modifier. The surface modification of nanoparticles is a known process as has been described by the applicant, e.g. in WO 93/21127 (DE 4212633) or WO 96/31572. The production of the surface-modified nanoparticles can in principle be carried out in two different ways, namely firstly by surface modification of previously produced nanosized nanoparticles and secondly by production of these nanoparticles using surface modifiers. The latter has been described comprehensively above for the silanes of the formula (II) which in the formation of the nanoparticles can in situ act as surface modifiers.

The surface modification of finished nanoparticles can be carried out simply by mixing the nanoparticles with the surface modifier. The reaction is optionally carried out in a solvent and, if necessary, by introduction of mechanical or thermal energy and/or by addition of a catalyst.

Suitable surface modifiers are compounds which firstly have one or more groups which can react or interact with reactive groups (for example OH groups) present on the surface of the nanoparticles. The surface modifiers can, for example, form covalent, coordinate (complex formation) and ionic (salt-like) bonds to the surface of the nanoparticles, while examples of pure interactions are dipole-dipole interactions, hydrogen bonds and van der Waals interactions. Preference is given to the formation of covalent bonds, ionic bonds or complexation.

The surface modifiers generally have a relatively low molecular weight. For example, the molecular weight can be less than 1500, in particular less than 1000 and preferably less than 700 and particularly preferably less than 500, but a higher molecular weight, e.g. up to 2000 or more, is also possible.

For the surface modification of the nanoparticles, it is possible to use inorganic and organic acids, bases, chelate formers, complex formers, e.g. ß-diketones, proteins which can have complex-forming structures, amino acids or silanes. The surface modifier can, in a preferred embodiment, be a complex former which effects the modification by complexation on the surface of the nanoparticles. Specific examples of surface modifiers are saturated or unsaturated monocarboxylic and polycarboxylic acids, the corresponding acid anhydrides, acid chlorides, esters and acid amides, amino acids, proteins, imines, nitriles, isonitriles, epoxy compounds, monoamines and polyamines, ß-dicarbonyl compounds such as ß-diketones, oximes, alcohols, alkyl halides, metal compounds which bear a functional group which can react with the surface groups of the particles, e.g. silanes having hydrolysable groups which have at least one unhydrolyzable group, e.g. hydrolysable silanes of the formula (II) above. Specific compounds for surface modifiers are, for example, mentioned in the abovementioned WO 93/21127 and WO 96/31572.

Particularly preferred surface modifiers are saturated or unsaturated carboxylic acids, ß-dicarbonyl compounds, amines, phosphonic acids, sulfonic acids or silanes. As stated above, the function group has, in a preferred embodiment, at least one functional group. For this purpose, use is made of surface modifiers which comprise not only a functional group for bonding to the surface of the nanoparticles but also at least one further functional group.

Examples of a further function group for the function group are hydroxy, epoxide, thiol, amino, carboxyl, carboxylic anhydride, isocyanato, sulfonic acid groups, phosphonic acid groups, quaternary amino groups, C—C double bond groups, e.g. acryl or methacryl, or carbonyl. In the broader sense, fluorinated hydrocarbon groups can also be included here. Accordingly, bifunctional, trifunctional or higher-functional surface modifiers are used for this purpose, with preference being given to preferred carboxylic acids, ß-dicarbonyl compounds, amines, phosphonic acids, sulfonic acids or silanes having at least one additional group selected from among the abovementioned functional groups, e.g. unsaturated carboxylic acids, hydroxycarboxylic acids, amino acids, aminosulfonic acids, aminophosphonic acids, functionalized ß-dicarbonyl compounds, epoxysilanes, (meth)acrylsilanes or isocyanatosilanes.

Examples of preferred compounds which are used for surface modification are listed below:

Examples of carboxylic acids, which preferably contain from 1 to 24 carbon atoms, are saturated monocarboxylic acids (e.g. formic acid, acetic acid, propionic acid, butyric acid, pentanoic acid, hexanoic acid, capric acid, stearic acid, phenylacetic acid, benzoic acid), saturated polycarboxylic acids having two or more carboxyl groups (e.g. oxalic acid, malonic acid, adipic acid, succinic acid, glutaric acid and phthalic acid), unsaturated carboxylic acids (e.g. acrylic acid, methacrylic acid, crotonic acid, maleic acid, fumaric acid and oleic acid) and hydroxycarboxylic acids (e.g. glycolic acid, lactic acid, malic acid and citric acid) and also derivatives of the carboxylic acids, for example anhydrides, esters (preferably $C_1$-$C_4$-alkyl esters, e.g. methyl methacrylate) and amides.

Examples of ß-dicarbonyl compounds, which preferably contain from 4 to 12, more preferably from 5 to 8, carbon atoms, are acetylacetone, 2,4-hexanedione, 3,5-heptanedione, acetoacetic acid and $C_1$-$C_4$-alkyl acetoacetate; and also functionalized dicarbonyl compounds such as 2-acetoacetoxyethyl methacrylate, hexafluoroacetylacetone and acetoacetamide.

Further examples are monoamines and polyamines, in particular those of the general formula $R_{3-n}NH_n$, where n=0, 1 or 2 and the radicals R are independently alkyl groups having from 1 to 12, in particular from 1 to 8 and particularly preferably from 1 to 6, carbon atoms (e.g. methyl, ethyl, n- and i-propyl, butyl or hexyl) and ethylenepolyamines (e.g. ethylenediamine, diethylenetriamine, etc.); sulfonic acids such as 2-aminoethanesulfonic acid and 3-aminobenzenesulfonic acid, phosphonic acids, amino acids; imines; and silanes such as the hydrolysable silanes having an unhydrolyzable group of the above general formula (II), with preference being given to those having a functional group on the unhydrolyzable radical.

Examples of further suitable surface modifiers are quaternary ammonium salts of the formula $NR^1R^2R^3R^{4+}X^-$, where $R^1$ to $R^4$ are optionally different aliphatic, aromatic or cycloaliphatic groups preferably having from 1 to 12, in particular from 1 to 8, carbon atoms, e.g. alkyl groups having from 1 to 12, in particular from 1 to 8 and particularly preferably from 1 to 6, carbon atoms (e.g. methyl, ethyl, n- and i-propyl, butyl or hexyl), and X is an inorganic or organic anion, e.g. acetate, OH— Cl—, Br— or I—.

The carbon chains of these compounds can be interrupted by O—, S— or NH groups. Such surface modifiers are, for example, oxaalkanoic acids, with 1, 2, 3 or more oxa groups being able to be present. Examples are 3,6,9-trioxadecanoic acid, 3-oxabutanoic acid, 2,6-dioxaheptanoic acid and homologs thereof.

Preferred examples of surface modifiers which have an additional group which can serve, for example, for crosslinking are functionalized ß-dicarbonyl compounds such as 2-acetoacetoxyethyl methacrylate, hexafluoroacetylacetone and acetoacetamide, aminosulfonic acids such as 2-aminoethanesulfonic acid and 3-aminobenzenesulfonic acid, unsaturated carboxylic acids such as methacrylic acid and oleic acid and hydroxycarboxylic acids such as lactic acid.

The nanoparticles produced according to the invention can also be coated with other materials to form particles having a core-shell structure. Possible coating materials are inorganic, organically modified inorganic or organic polymeric materials. Inorganic or organically modified inorganic coatings or coating compositions can be obtained, for example, from the abovementioned hydrolysable compounds. Organic coatings can be formed from conventional organic polymers used as binders in coating compositions or optionally modified naturally occurring polymers, for example various sugars, e.g. starches, and derivatives thereof, proteins or celluloses or derivatives thereof.

The nanoparticles of the invention can be used as such or as sol or else in the form of a composition containing the nanoparticles. The composition can contain additives suitable for the specific application. In particular, the composition can contain one or more conventional matrix formers.

Possible compositions which contain the nanoparticles according to the invention are, for example, a variety of coating systems such as surface coatings, adhesives, compositions such as sealants and molding compositions, composites, ceramic raw materials such as slips, pastes, suspensions, sols of all types, glass melts and glass-forming sols, solutions and dissolved monomers, polymers and polymer melts, which can also contain other components, e.g. the abovementioned matrix formers, plasticizers, thermally and radiation-induced polymerization and polycondensation catalysts and known further additives including other nanoparticles. Metals or combinations of polymers, glass-like, metallic or ceramic matrix precursors as hybrid materials are also possible as matrix formers.

Optionally, organic monomers, oligomers or polymers of all types can also be present as organic matrix-forming materials; these serve as flexibilizers and can be conventional organic binders. These can be used for improving the coatability. In general, they are photocatalytically degraded after manufacture of the layer. The oligomers and polymers can have functional groups via which crosslinking is possible. This crosslinking opportunity may also be present in the case of the abovementioned organically modified inorganic matrix-forming materials. Mixtures of inorganic, organically modified inorganic and/or organic matrix-forming materials are also possible.

The invention also provides nanoparticles produced by the process of the invention. These are preferably oxidic doped nanoparticles, preferably photocatalytically active nanoparticles, in particular doped nanoparticles comprising titanium dioxide.

The nanoparticles have an average diameter of less than 100 nm, preferably an average diameter of less than 50 nm, particularly preferably less than 20 mm (determined by means of TEM).

In particular, the nanoparticles have a maximum diameter of less than 200 nm, preferably less than 100 nm, particularly preferably less than 50 nm, or less than 30 nm (determined by means of TEM).

In an embodiment of the invention, at least 50% of the particles (count) are cube-shaped, preferably at least 60%, in particular at least 80%.

The particles according to the invention can be introduced into all types of coatings, as described, for example in EP 1 525 338 B1.

The photocatalytic layers obtained can, for example, be used as self-cleaning surfaces (optionally assisted by irradiation with light) or for air purification. They are suitable for a variety of uses for antimicrobial purposes and/or for self-cleaning, e.g. for machines, paints, varnishes, furniture, exterior walls, roofs, textiles, vehicles, signal units, films, protective and dividing walls, traffic technology, automobiles, aircraft and rail vehicles, windows, doors, greenhouses, masonry walls, tiles, floors, tents, tarpaulins, outdoor facilities, fences, natural stone, concrete, renders, paving stones, floor slabs, monuments, wood, slabs, linings, window frames, coverings, polymer surfaces of all types, polymer glazing, helmets, visors, housings, instruments of all types, e.g. medical instruments, domestic appliances, traffic signs, steel constructions and steel exterior walls, antifogging coatings, e.g. on glass, mirrors, linings or partitions.

A particular field of use is sterilization or protection of instruments of all types, in particular medical, including veterinary and dental, instruments and appliances in the sanitary sector, against soiling. Important further fields of application are food technology and the dairy industry.

In the case of photocatalytically active nanoparticles, the particles obtained are also suitable for depositing metallic layers on correspondingly coated surfaces. The improved photocatalytic activity, in particular in the visible range, considerably increases the effectiveness of the deposition. Furthermore, the wavelengths in the visible range allow the use of cheaper light sources, optics and masks made of more inexpensive glass. Owing to the higher activity in the UV range, too, improved deposition is also achieved when using light sources and optics employed hitherto for the UV range.

For this purpose, a substrate is firstly provided with an initiator layer comprising photocatalytically active doped nanoparticles according to the invention, preferably comprising $ZnO_2$ or $TiO_2$.

The substrate which is to be coated with the photocatalytic initiator layer can be any material suitable for this purpose. Examples of suitable materials are metals or metal alloys, glass, ceramic, including oxide ceramic, glass-ceramic or polymers, and also paper and other cellulose-containing materials. Of course, it is also possible to use substrates which have a surface layer composed of the abovementioned materials. The surface layer can be, for example, a metallization, enameling, a glass or ceramic layer or a paint or varnish.

Examples of metals or metal alloys are steel, including stainless steel, chromium, copper, titanium, tin, zinc, brass and aluminum. Examples of glass are soda-lime glass, borosilicate glass, lead crystal and fused silica. It can be, for example, sheet glass, hollow glass such as vessel glass or laboratory apparatus glass. The ceramic is, for example, a ceramic based on the oxides $SiO_2$, $Al_2O_3$, $ZrO_2$ or $MgO$ or the corresponding mixed oxides. Examples of the polymer, which, like the metal, can be present as thin sheet, are polyethylene, e.g. HDPE or LDPE, polypropylene, polyisobutylene, polystyrene (PS), polyvinyl chloride (PVC), polyvinylidene chloride, polyvinyl butyral, polytetrafluoroethylene, polychlorotrifluoroethylene, polyacrylates, polymethacrylates such as polymethyl methacrylate (PMMA), polyamide, polyethylene terephthalate (PET), polycarbonate, regenerated cellulose, cellulose nitrate, cellulose acetate, cellulose triacetate (TAC), cellulose acetate butyrate, polyethylene napthalate (PEN), cycloolefin copolymers (COC) or rubber hydrochloride. A painted or varnished surface can be formed from conventional primers or surface coatings. In a preferred embodiment, the substrates are thin sheets, in particular polyethylene terephthalate films or polyimide films.

For this purpose, a dispersion of the nanoparticles (initiator composition) is usually applied to the substrate.

The initiator composition is generally a dispersion of the nanoparticles in at least one solvent. The proportion of nanoparticles is in this case less than 20% by weight, preferably less than 10% by weight, particularly preferably less than 5% by weight. A preferred range is from 0.5% by weight to 3% by weight. Examples are 1% by weight, 1.5% by weight, 2% by weight and 2.5% by weight. The proportion here is based on the initiator composition.

Suitable solvents are solvents known to those skilled in the art for nanoparticles. Preference is given to solvents which have a boiling point below 150° C. Examples are deionized $H_2O$, methanol, ethanol, isopropanol, n-propanol or butanol. It is also possible to use mixtures.

The above-described surface modifiers such as carboxylic acids and also acids or bases can additionally be added.

The initiator composition can be applied using conventional methods, for example dipping, rolling, doctor blade coating, flooding, drawing, spraying, spin coating or painting. The applied dispersion is optionally dried and heat treated, for instance to effect curing or densification. The heat treatment used for this purpose naturally depends on the substrate. In the case of polymer substrates or polymer surfaces, which generally have a barrier layer, very high temperatures can naturally not be used. Thus, polycarbonate (PC) substrates are heat treated, for example, at about 130° C. for 1 hour. In general, the heat treatment is carried out, for example, at a temperature of from 100 to 200° C. and, if no polymer is present, up to 500° C. or more. The heat treatment is carried out for, for example, from 2 minutes to 2 hours.

In a next step, a precursor composition comprising at least one precursor compound for a metal layer is applied to the substrate. To apply the precursor composition, it is possible to use customary methods, for example dipping, rolling, doctor blade coating, flooding, drawing, spraying, spin coating or painting. The precursor composition is usually a solution or suspension of the at least one precursor compound. This solution can also contain a mixture of a plurality of precursor compounds. Further auxiliaries such as reducing agents or wetting agents can also be present in the solution.

The precursor compound is preferably a metal complex. This comprises at least one metal ion or a metal atom and at least one type of ligand. The metal is, for example, copper, silver, gold, nickel, zinc, aluminum, titanium, chromium, manganese, tungsten, platinum or palladium. In a preferred embodiment, the precursor compound is a silver, gold or copper complex, particularly preferably a silver complex. The precursor compound can also comprise a number of types of metal or mixtures of metal complexes.

Chelating ligands are generally used as ligand. These are able to form particularly stable complexes. They are compounds which have a plurality of hydroxyl groups and/or amino groups. Preference is given to compounds having a molecular weight of less than 200 g/mol, particularly preferably compounds having at least one hydroxyl group and at least one amino group. Examples of possible compounds are 3-amino-1,2-propanediol, 2-amino-1-butanol, tris(hydroxymethyl)aminomethane (TRIS), $NH_3$, nicotinamide or 6-aminohexanoic acid. It is also possible to use mixtures of these ligands. In the case of the preferred silver complex, TRIS is preferred as ligand.

The precursor composition is preferably a solution of the precursor compound. Possible solvents are all suitable solvents. These are, for example, water, alcohols such as methanol, ethanol, n-propanol or i-propanol. It is also possible to use mixtures of the solvents, preferably mixtures of water and ethanol.

The precursor composition can additionally contain further auxiliaries such as surfactants or supporting reducing agents.

The precursor composition can be applied to the substrate in any way. Here, the precursor composition is applied in such a way that the reduction of the metal ion to the metal can be triggered directly or indirectly by the photocatalytic activity of the initiator layer. This usually occurs by the precursor composition being applied directly to the initiator layer.

The precursor composition can be applied using conventional methods, for example dipping, spraying, rolling, doctor blade coating, flooding, drawing, spraying, spin coating or painting.

In a next step, the metal ion of the precursor compound is reduced to the metal by action of electromagnetic radiation on the initiator. This forms a metallic layer. The electromagnetic radiation is radiation having at least one wavelength for exciting the initiator. Irradiation can here be effected by use of an areal radiation source such as a lamp or by means on lasers. Preference is given to using radiation having a wavelength in the visible and/or ultraviolet (UV) range of the electromagnetic spectrum, preferably radiation having a wavelength of <600 nm, for example in the range from 200 to 450 nm or in the range from 250 nm to 450 nm.

The nanoparticles of the invention are characterized by, in particular, displaying photocatalytic activity at wavelengths of more than 400 nm, in particular more than 400 nm and less than 450 nm. Thus, metallic layers can also be deposited using these wavelengths. This also makes deposition through commercial glass possible. In addition, the total activity is higher than in the case of undoped particles.

As light source, it is possible to use any suitable light source. Examples of light sources are lasers, LEDs, mercury vapor lamps or xenon lamps.

The light source is arranged at a suitable distance from the substrate to be illuminated. The distance can be, for example, from 2.5 cm to 50 cm. The intensity of the radiation in a spectral range from 250 nm to 410 nm can be from 1 mW/cm$^2$ to 10 W/cm$^2$.

Irradiation should preferably be effected perpendicularly to the surface to be illuminated.

The irradiation is carried out for the time sufficient for forming the metallic layer. The time depends on the coating, the type of initiator, the type of lamp, the wavelength range used and the intensity of the irradiation. If conductive structures are to be produced, a longer irradiation time can be necessary. The duration of irradiation is preferably in the range from 5 seconds to 10 minutes, preferably from 20 seconds to 4 minutes.

If a laser is used for irradiation, the laser beam can be moved relative to the substrate, for example to produce structures.

In a further embodiment of the invention, the substrate is treated further after irradiation and reduction of the precursor compound. Thus, for example, the unreduced excess precursor composition can be removed by rinsing the surface, for example with deionized water or another suitable substance. The coated substrate can then be dried, for example by heating in an oven, by means of compressed air and/or by drying at room temperature.

It is also possible for further layers to be additionally applied, for example to protect the coated surface against oxidation and water or against UV radiation.

In a preferred embodiment of the invention, structuring occurs on application of the precursor composition and/or in the reduction. For the purposes of the present invention, this means provision of spatially limited production of the metallic structure. This can be achieved in various ways. Firstly, the substrate can be coated with the initiator composition only in particular regions. In addition, the precursor composition can be applied only to particular regions. Furthermore, it is naturally also possible for the action of the electromagnetic radiation to be restricted to particular regions. These methods can naturally also be used in combination. Thus, it is possible, for example, firstly to apply the precursor composition over the full area and then to illuminate it through a mask. It is naturally likewise possible to apply the precursor composition in a targeted manner and then to illuminate the full area.

As regards the quality of the structures obtained, not only the photocatalytic activity of the initiator but also the quality, for example the wettability or roughness, of the initiator layer in respect of the precursor composition plays a role. Especially the initiator compositions of the invention are characterized by targeted application of the precursor composition and/or very targeted reduction of the precursor compound on them being possible.

In a preferred embodiment of the invention, the structuring comprises structures having a minimum lateral dimension of less than 500 µm. This means that the structures produced on the substrate have a minimum width of 500 µm, with preference being given to a dimension of less than 100 µm, 50 µm, 20 µm, particularly preferably 10 µm, in particular 5 µm or 1 µm.

For the desired resolution of the metallic structures, i.e. the formation of the metal layer, the structure of the photocatalytic layer formed is of importance. Apart from the use of the nanoparticles of the invention, it is possible to achieve the desired resolution by pretreatment of the substrate. Such a pretreatment can also involve the application of a further layer.

In a preferred embodiment of the invention, the pretreatment comprises a plasma treatment, corona treatment, flame treatment and/or application and curing of an organic-inorganic coating. A plasma treatment, corona treatment and/or flame treatment is particularly useful in the case of thin sheet substrates, in particular in the case of polymer films. It has been found here that such a treatment improves the quality of the photocatalytic layer obtained.

Possible ways of obtaining plasma under vacuum conditions have frequently been described in the literature. The electric energy can be introduced by inductive or capacitive means. It can be direct current or alternating current; the frequency of the alternating current can range from a few kHz up into the MHz range. Introduction of energy in the microwave range (GHz) is also possible.

As primary plasma gases, it is possible to use, for example, He, argon, xenon, $N_2$, $O_2$, $H_2$, steam or air, and likewise mixtures of these compounds. Preference is given to an oxygen plasma.

The substrates are usually cleaned beforehand. This can occur by simple rinsing with a solvent. The substrates are then optionally dried and subsequently treated with plasma for less than 5 minutes. The treatment time can depend on the sensitivity of the substrate. It is usually in the range from 1 to 4 minutes.

A further possible way of improving the quality of the photocatalytic layer is prior flame treatment of the surface. Such a treatment is known to those skilled in the art. The parameters to be selected are prescribed by the particular substrate to be treated. For example, the flame temperatures, the flame intensity, the residence times, the distance between substrate and furnace, the presence of the combustion gas, air pressure, moisture, are matched to the substrate in question. As flame gases, it is possible to use, for example, methane, propane, butane or a mixture of 70% of butane and 30% of propane. This treatment is preferably also employed in the case of thin sheets, particularly preferably in the case of polymer films.

A particular advantage of the process of the invention lies in that the compositions used are applied to the substrates in a simple way. Here, the initiator layer comprising the nanoparticles allows the production of particularly fine structures in only a few steps. All known printing processes such as inkjet printing, gravure printing, screen printing, offset printing or letterpress printing and flexographic printing are used for this purpose. Combination prints of the abovementioned printing methods are often also used for the printing of the electric functionalities. It can be necessary to match the printing plates, rollers or stamps used to the properties of the compositions, for example by adapting their surface energy.

The structures applied by means of structuring are actually not subject to any restriction. Thus, joined structures such as conductor tracks can be applied and in addition it is also possible to apply dot-like structures. Owing to the good resolution, the process makes it possible to apply conductive dots or lines which are not visible to the human eye to a film. This plays an important role in the production of surfaces for touch screens.

A particular advantage of the invention is in the production of conductive structures. These are suitable as conductor tracks in electronic applications, in particular in touch screen displays, solar collectors, displays, as RFID antennae or in transistors. They are therefore suitable as substitute in products which have previously been produced on the basis of ITO (indium-tin oxide), for example in TCO (transparent conductive oxide) coatings.

The structures can, however, also be used in the field of transistors.

Further details and features are derived from the following description of preferred working examples in combination with the dependent claims. Here, the respective features can be realized either alone or in combinations of a plurality thereof. The possible ways of achieving the object are not restricted to the working examples. Thus, for example, ranges indicated always encompass all intermediate values which are not mentioned and all conceivable subranges.

The working examples are shown schematically in the figures. Identical reference symbols in the individual figures denote identical elements or elements having the same functions or corresponding to one another in respect of their functions. In detail, the figures show:

DETAILED DESCRIPTION OF THE DRAWINGS

1. Synthesis of N-Doped Tio$_2$

Figure 1:
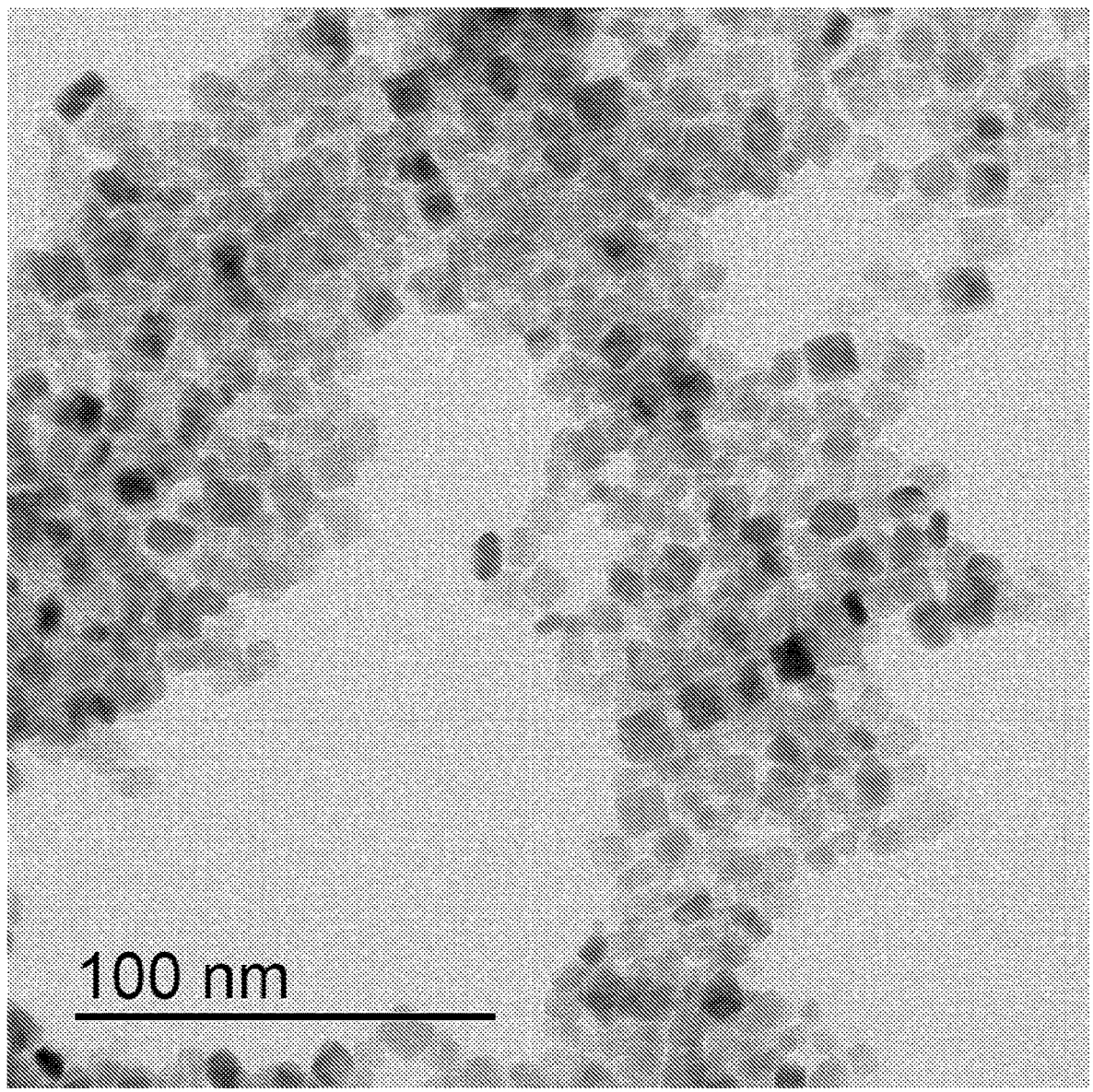
FIG. 1 transmission electron micrograph of nanoparticles according to the invention.
Figure 2:
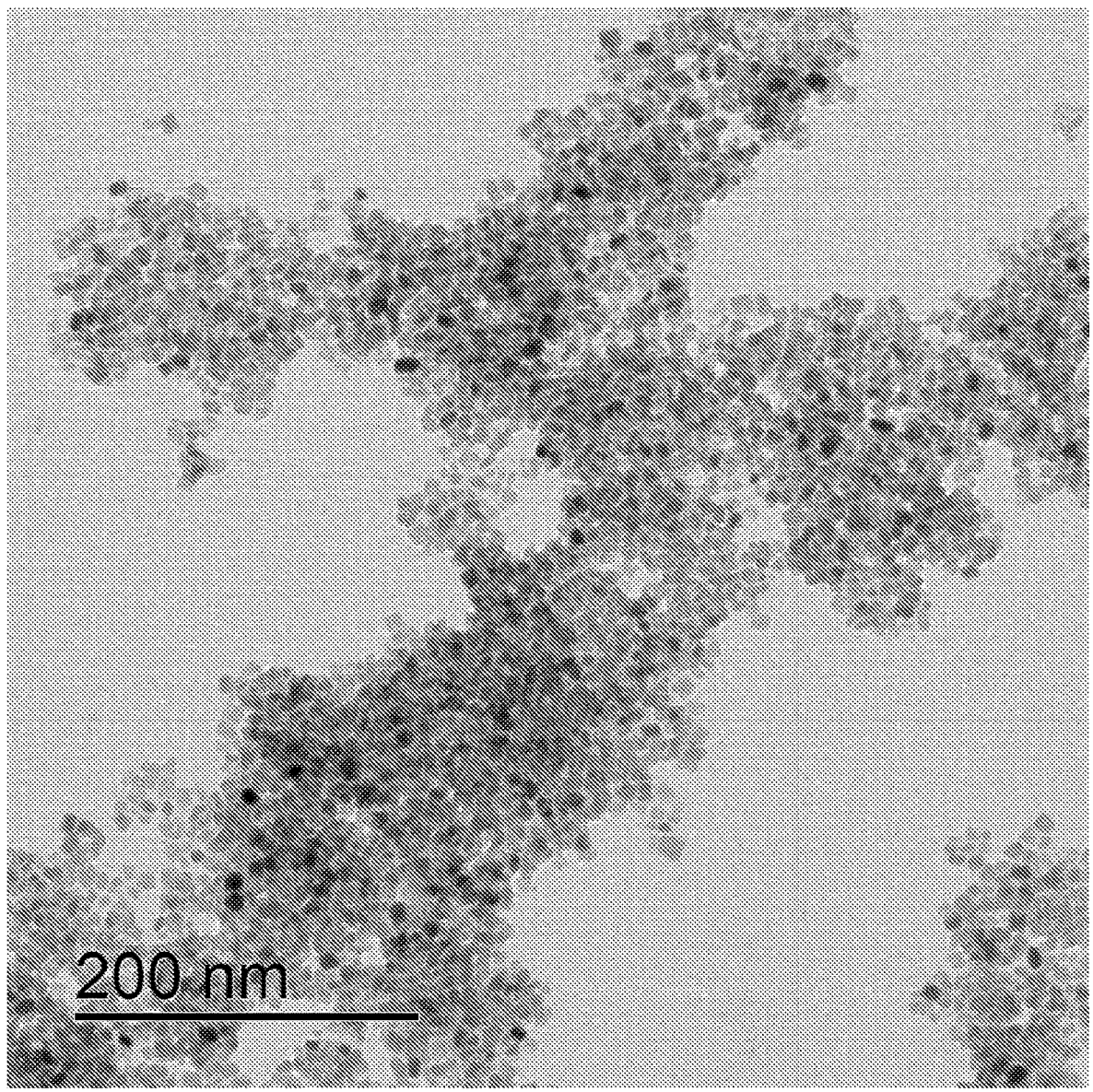
FIG. 2 transmission electron micrograph of nanoparticles according to the invention.

N-doped TiO$_2$ nanoparticles were produced by means of the solvothermal process. 24.26 g of titanium isopropoxide were dissolved in 26.36 g of 1-propanol. 1.58 g of HNO$_3$ (68%) were added to 5 g of 1-propanol and added to the titanium tetraisopropoxide solution while stirring. 2.56 g of water were dissolved in 10 g of 1-propanol and slowly added dropwise to the titanium tetraisopropoxide solution. The solution was stirred for 20 minutes, transferred into Teflon vessels for the autoclave and heated to 225° C. for 1 hour. The heating rate was 5 K/min. After cooling, the supernatant solution was decanted off and the solvent was removed from the residue on a rotary evaporator. Yield: 7.5 g of a brown solid, particle size: 11.8 nm. FIGS. 1 and 2 show transmission electron micrographs of the particles obtained.

2. SYNTHESIS OF C/N-DOPED TIO$_2$

C/N-doped TiO$_2$ nanoparticles were produced by means of a solvothermal process. 24.26 g of titanium isopropoxide were dissolved in 26.36 g of 1-propanol. 1.58 g of HNO$_3$ (68%) were added to 5 g of 1-propanol and added to the titanium tetraisopropoxide solution while stirring. 2.56 g of water and 0.3 g of glucose were dissolved in 10 g of 1-propanol and slowly added dropwise to the titanium tetraisopropoxide solution. The solution was stirred for 20 minutes, transferred into Teflon vessels for the autoclave and heated to 225° C. for 1 hour. The heating rate was 5 K/min. After cooling, the supernatant solution was decanted off and the solvent was removed from the residue on a rotary evaporator. Yield: 7.89 g of a brown solid, particle size: 13.5 nm

3. PRODUCTION OF A SOL FOR DIP COATING 0.3-0.9 g of particles (as per No. 1 or No. 2) were dispersed in 4 g of 0.1 M HNO$_3$. 0.67 ml of 3,6,9-trioxadecanoic acid per 1 g of particles was added. After stirring for 10 minutes, 46 g of 2-isopropoxyethanol were added.

4. COATING BY MEANS OF DIP COATING

Glass substrates were coated by means of dip coating. A cleaned glass substrate was dipped into the sol as per No. 3. The drawing speed was 1 mm/s–5 mm/s. Optically transparent layers were obtained.

5. WAVELENGTH-DEPENDENT PHOTOMETALLIZATION 0.5 ml of a mixture of a silver nitrate solution (0.845 g of AgNO$_3$ in 10 g of distilled water) and a TRIS solution (1.284 g of tris(hydroxymethyl)aminomethane in 10 g of distilled water) was applied to a coated microscope slide (as per No. 4). The solution was illuminated for 5 minutes with light from a 1000 W Hg/Xe lamp which had been split by means of a monochromator. Silver deposits were observed up to wavelengths of 435 nm.

6. PHOTOMETALLIZATION AT 405 NM 0.5 ml of a mixture of a silver nitrate solution (0.845 g of AgNO$_3$ in 10 g of distilled water) and a TRIS solution (1.284 g of tris(hydroxymethyl)aminomethane in 10 g of distilled water) was applied to a coated microscope slide (as per No. 4). The solution was illuminated with light from a 405 nm LED. Conductive layers are obtained after only 3 minutes.

7. PHOTOMETALLIZATION THROUGH A GLASS PLATE 0.5 ml of a mixture of a silver nitrate solution (0.845 g AgNO$_3$ in 10 g of distilled water) and a TRIS solution (1.284 g of tris(hydroxymethyl)aminomethane in 10 g of distilled water) was applied to a coated microscope slide (as per No. 4 with particles according to No. 1), and this was covered with a second microscope slide and illuminated for 10 s with light from a 1000 W Hg/Xe lamp. Conductive layers were obtained.

8. DIRECT LASER INSCRIPTION 0.5 ml of a mixture of a silver nitrate solution (0.845 g of AgNO$_3$ in 10 g of distilled water) and a TRIS solution (1.284 g of tris(hydroxymethyl)aminomethane in 10 g of distilled water) was applied to a coated microscope slide (as per No. 4 with particles according to No. 1). A grid structure was inscribed on this by means of a laser (376 nm). The silver structure obtained is conductive.

9. MASK ILLUMINATION

The silver complex solution was introduced between a coated substrate (as per No. 4 with particles according to No. 1) and a mask composed of fused silica. The solution was illuminated through the mask by means of a 1000 W Hg/Xe lamp. The illumination time until conductive structures (5 μm line width) are obtained is 1 minute (for undoped TiO$_2$: 3 minutes).

Figure 3:
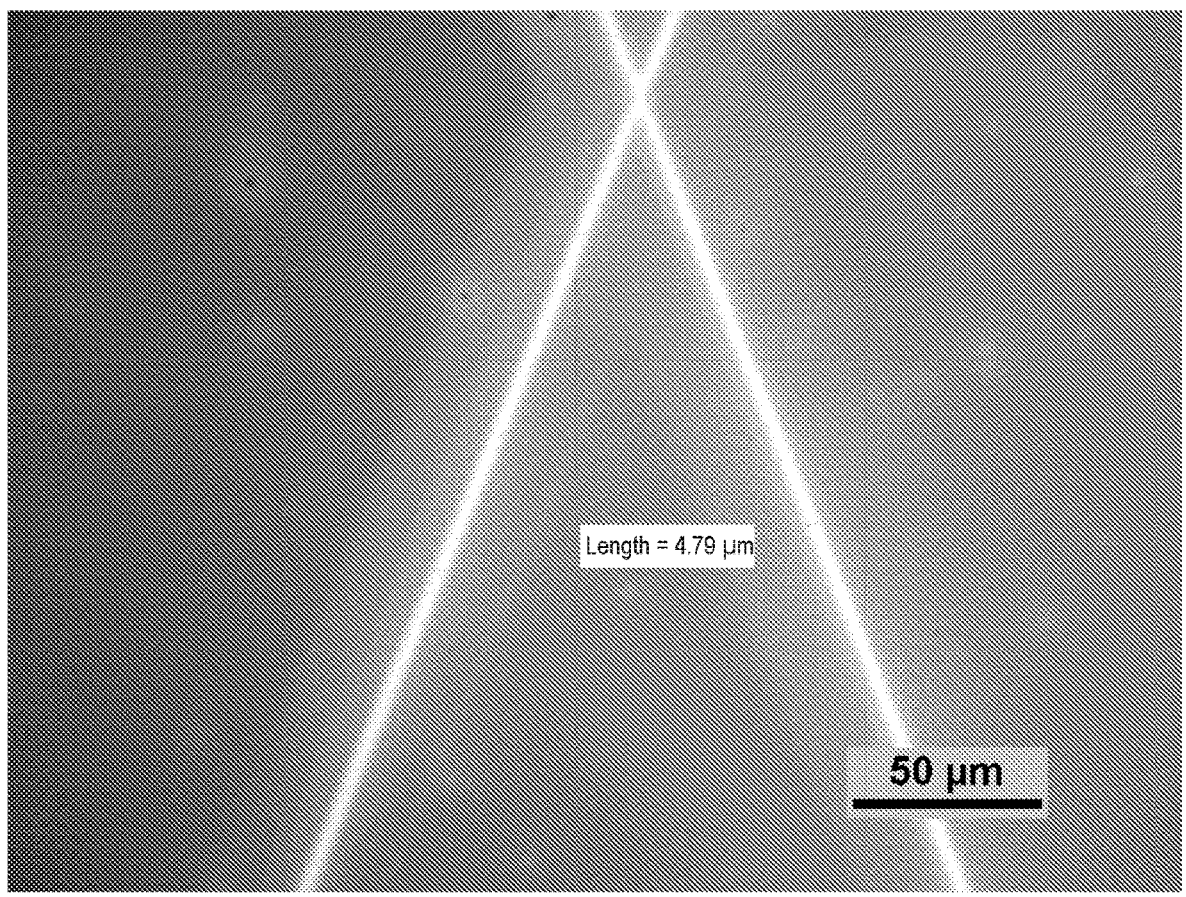
FIG. 3 photograph of an illumination.

FIG. 3 shows an optical micrograph of a metallic structure obtained after illumination for 1 minute. The structure has a width of 4.79 μm.

The undoped particles were produced as described in DE102010052032A1.

48.53 of Ti(O—i—Pr)$_4$ were added to 52.73 g of 1-PrOH (n-propanol). A solution composed of hydrochloric acid (37%, 3.34 g) and 10.00 g of 1-PrOH was slowly added dropwise to this solution. A mixture of 4.02 g of $H_2O$ and 20.00 g of 1-PrOH was then added dropwise to this solution. The solution obtained may be slightly yellowish and was introduced into a pressure digestion vessel (about 130 g). The solution was treated for 2.5 hours at 210° C. in this vessel.

The mixture was decanted and the particles obtained were transferred to a flask and the solvent was removed under reduced pressure at 40° C. on a rotary evaporator.

The particles were then applied in an analogous way to the substrates.

The invention claimed is:

1. A process for producing doped nanoparticles, which comprises:
   a) provision of a composition comprising:
      at least one hydrolysable metal compound,
      at least one compound having at least one hydroxyl group, and
      at least one mineral acid comprising at least one nitrogen atom;
   b) hydrothermal treatment of the composition to form doped nanoparticles, wherein the nanoparticles are doped with nitrogen from the at least one mineral acid; and
   c) isolation of the doped nanoparticles.

2. The process as claimed in claim 1, wherein the hydrolysable compound is a compound of the formula $MX_n$ 

where M is selected from the group consisting of Mg, B, Al, Ga, In, Si, Ge, Sn, Pb, Y, Ti, Zr, V, Nb, Ta, Mo, W, Fe, Cu, Ag, Zn, Cd, Ce and La and
n corresponds to the valence of the metal and X is a hydrolysable group.

3. The process as claimed in claim 1, wherein the at least one compound having at least one hydroxyl group has a boiling point below 200° C.

4. The process as claimed in claim 1, wherein the at least one compound having at least one hydroxyl group is a lower aliphatic alcohol.

5. The process as claimed in claim 1, wherein the mineral acid comprising at least one nitrogen atom is nitric acid.

6. The process as claimed in claim 5, wherein the nitric acid catalyzes hydrolysis of the hydrolysable metal compound.

7. The process as claimed in claim 5, wherein a molar ratio of nitrogen to the metal of the hydrolysable metal compound is from 0.05:1 to 0.7:1.

8. The process as claimed in claim 1, wherein the nanoparticles are photocatalytically active nanoparticles.

9. The process as claimed in claim 1, wherein the nanoparticles are photocatalytically active nanoparticles which are photocatalytically active at wavelengths above 400 nm.

10. The process as claimed in claim 1, wherein the composition does not contain any organic compound comprising at least one nitrogen atom.

11. The process as claimed in claim 1, wherein a molar ratio of nitrogen to the metal of the hydrolysable metal compound is from 0.001:1 to 0.4:1.

12. A process for producing metallic structures, which comprises:
   (a) application of an initiator composition to a substrate, where the composition comprises photocatalytically active nanoparticles produced as in claim 1 as initiator;
   (b) application of a precursor composition comprising at least one precursor compound for a metal layer to the substrate; and
   (c) reduction of the precursor compound to the metal by action of electromagnetic radiation on the initiator.

13. A process for producing metallic structures, comprising:
   application of an initiator composition to a substrate, where the composition comprises photocatalytically active nanoparticles produced as claimed in claim 5 as initiator;
   application of a precursor composition comprising at least one precursor compound for a metal layer to the substrate; and
   reduction of the precursor compound to the metal by action of electromagnetic radiation on the initiator.

14. A process for producing metallic structures, comprising:
   application of an initiator composition to a substrate, where the composition comprises photocatalytically active nanoparticles produced as claimed in claim 6 as initiator;
   application of a precursor composition comprising at least one precursor compound for a metal layer to the substrate; and
   reduction of the precursor compound to the metal by action of electromagnetic radiation on the initiator.

15. A method comprising depositing nanoparticles produced as in claim 5 to form a metallic layer.

* * * * *